Figure 1:
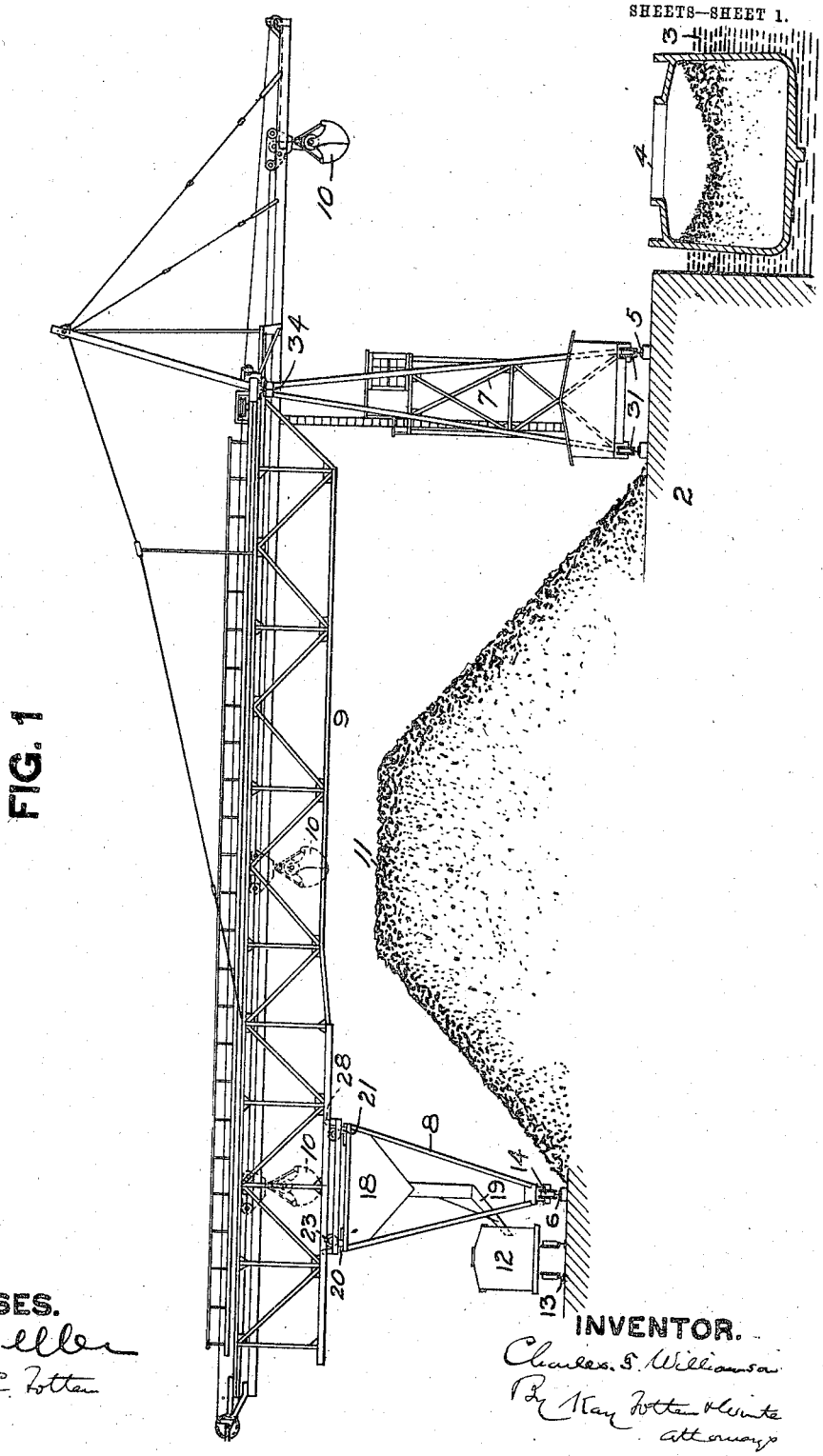

No. 858,314. PATENTED JUNE 25, 1907.
C. S. WILLIAMSON.
COAL HANDLING BRIDGE.
APPLICATION FILED OCT. 27, 1906.

SHEETS—SHEET 1.

WITNESSES.
INVENTOR.

No. 858,314. PATENTED JUNE 25, 1907.
C. S. WILLIAMSON.
COAL HANDLING BRIDGE.
APPLICATION FILED OCT. 27, 1906.
5 SHEETS—SHEET 2.
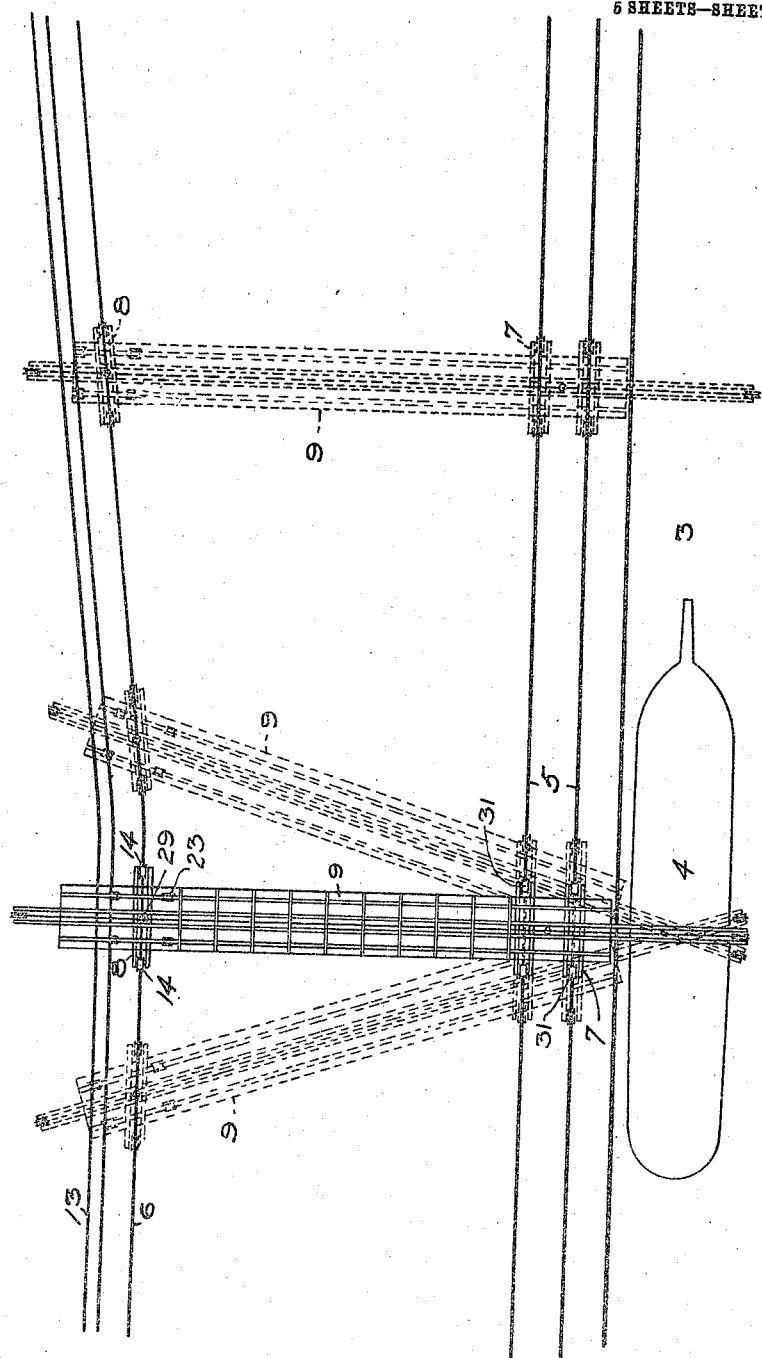
WITNESSES.
INVENTOR.

No. 858,314. PATENTED JUNE 25. 1907.
C. S. WILLIAMSON.
COAL HANDLING BRIDGE.
APPLICATION FILED OCT. 27, 1906.
5 SHEETS—SHEET 3.
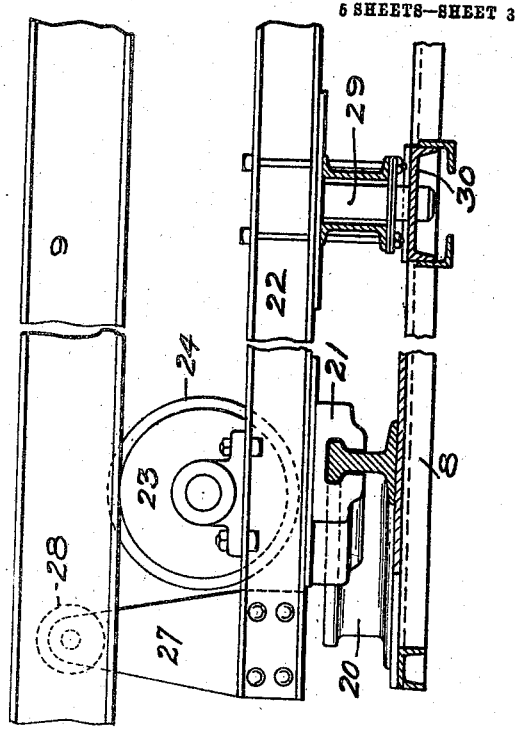
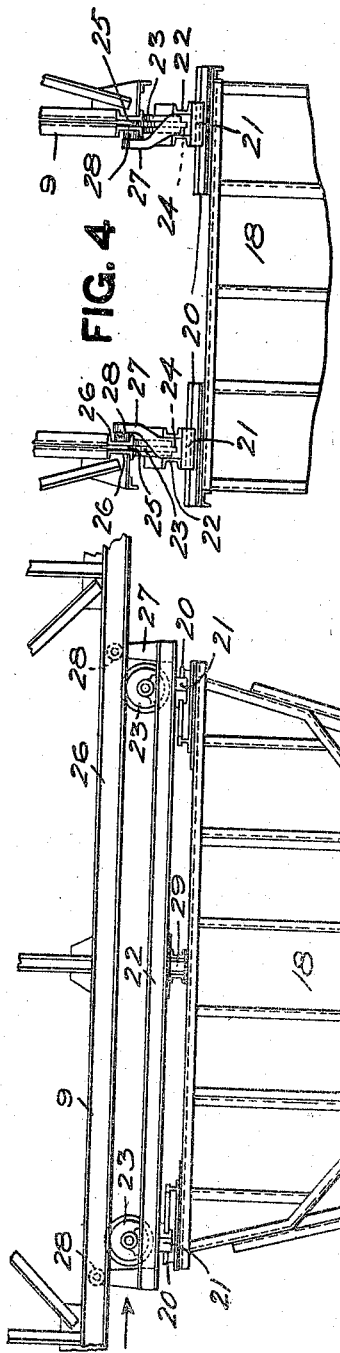
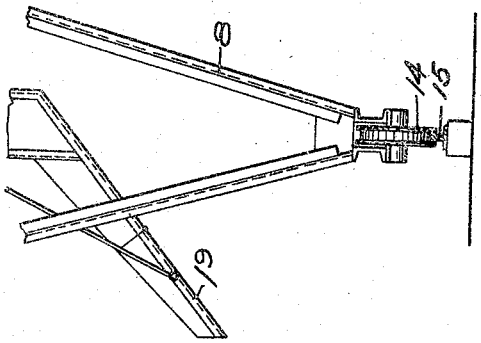

No. 858,314.  
PATENTED JUNE 25, 1907.
C. S. WILLIAMSON.
COAL HANDLING BRIDGE.
APPLICATION FILED OCT. 27, 1906.

5 SHEETS—SHEET 4.

WITNESSES.
J. R. Keller
Robt. C. Totten

INVENTOR.
Charles S. Williamson
By Kay, Totten & Winter
attorneys

No. 858,314. PATENTED JUNE 25, 1907.
C. S. WILLIAMSON.
COAL HANDLING BRIDGE.
APPLICATION FILED OCT. 27, 1906.
5 SHEETS—SHEET 5.
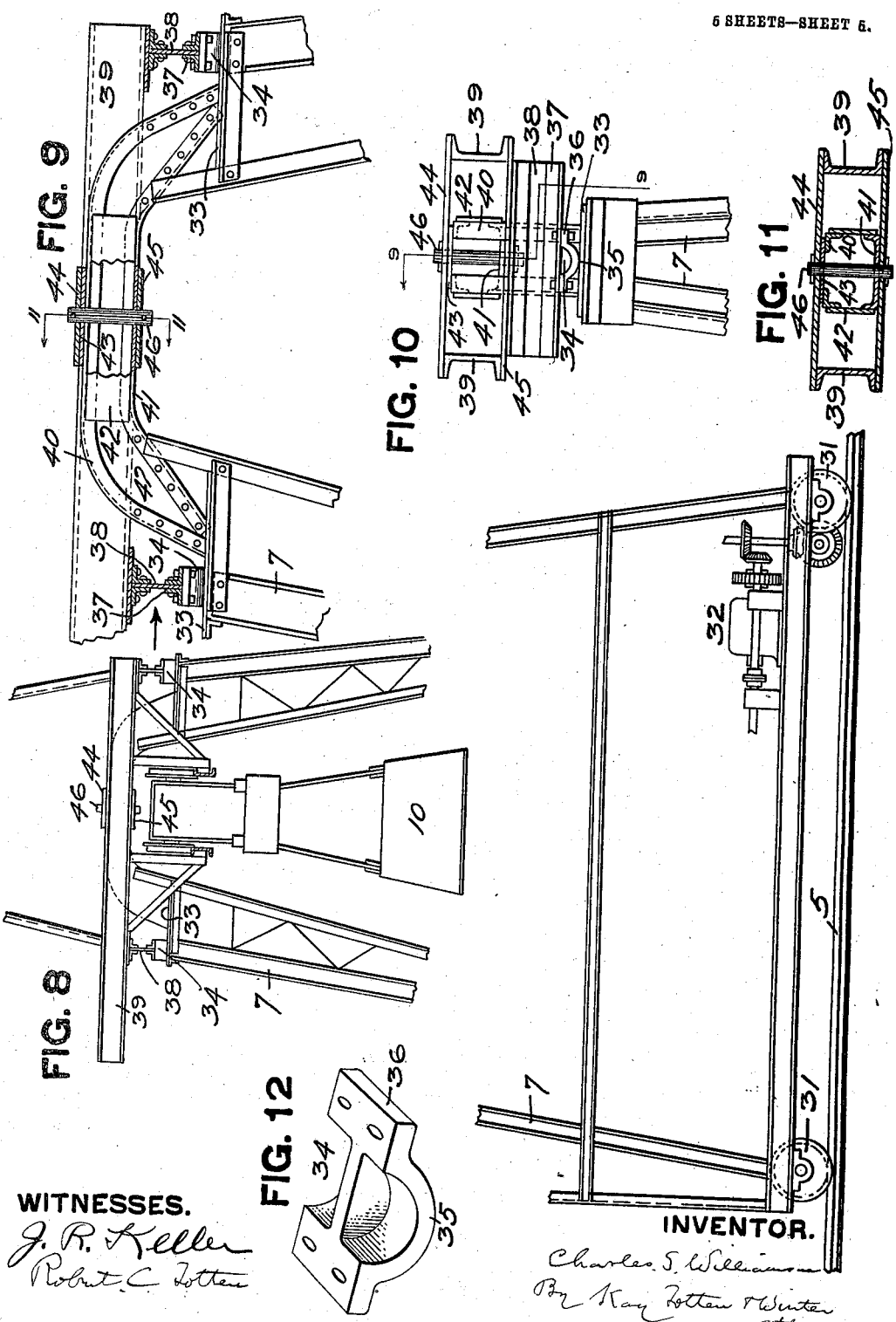
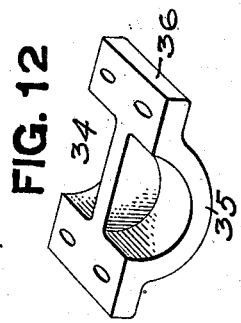
WITNESSES.
INVENTOR.

UNITED STATES PATENT OFFICE.

CHARLES S. WILLIAMSON, OF PITTSBURG, PENNSYLVANIA, ASSIGNOR OF ONE-HALF TO HEYL & PATTERSON INCORPORATED, OF PITTSBURG, PENNSYLVANIA, A CORPORATION OF PENNSYLVANIA.

COAL-HANDLING BRIDGE.

No. 858,314.   Specification of Letters Patent.   Patented June 25, 1907.

Application filed October 27, 1906. Serial No. 340,928.

*To all whom it may concern:*

Be it known that I, CHARLES S. WILLIAMSON, a resident of No. 4259 Fifth avenue, Pittsburg, in the county of Allegheny and State of Pennsylvania, have invented a new and useful Improvement in Coal-Handling Bridges; and I do hereby declare the following to be a full, clear, and exact description thereof.

My invention relates to apparatus for handling coal or like material.

In the handling of coal, as in the case of unloading it from barges and putting it into a storage pile or transferring it directly from boats to be loaded into cars, it is usually customary to employ a bridge of sufficient height to allow of the storage of the coal beneath the same, and carrying the loading or unloading apparatus by means of which the coal is carried from the barges to the storage pile or to the chute which deposits the coal into the cars, run on to tracks in such position to receive the coal. In such plants where the railroad tracks upon which the cars travel are directly parallel with the line of travel of the bridge it is not necessary to provide for any substantial variation in the span of the bridge due to any variation in the distance between the tracks supporting the car and that upon which the bridge travels. Where, however, the railrod track does not run parallel with the tracks upon which the bridge travels, but may be located at an angle thereto so that the space between the railroad tracks and the tracks of the front pier may vary, such variation must be provided for by varying the length of the span of the bridge.

The object of my invention, therefore, is to provide for this variation in the span of the bridge to conform to the varying distance of the railroad track from the tracks upon which the front pier travels and to this end my invention comprises the novel features hereinafter set forth and claimed.

Figure 6:
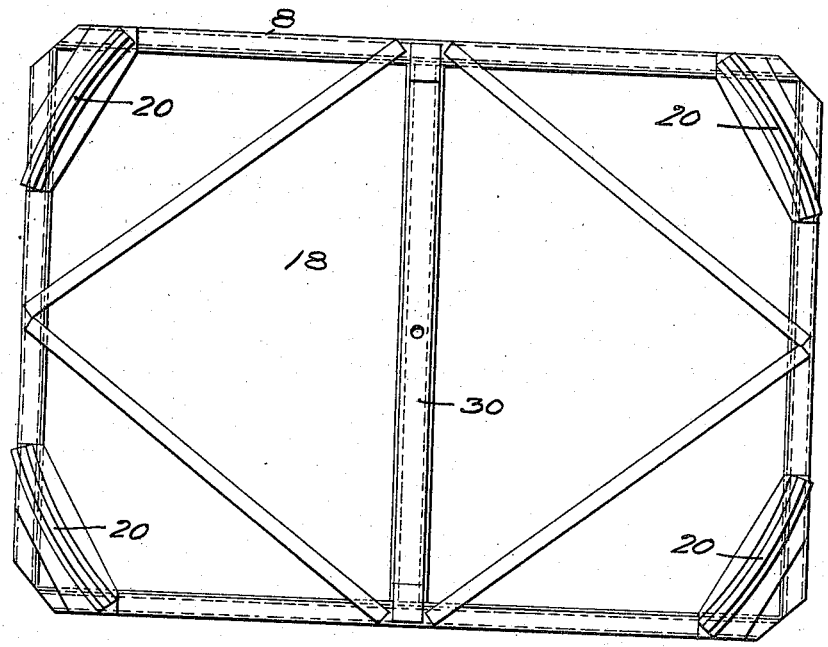
Figure 7:
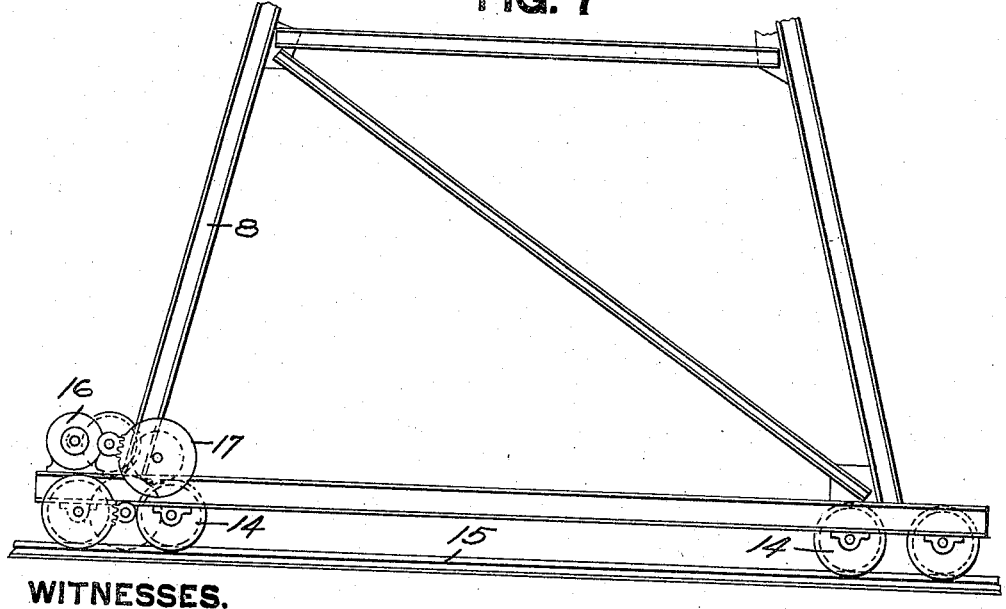

In the accompanying drawings Figure 1 is a side elevation of a coal handling apparatus embodying my invention; Fig. 2 is a plan view thereof largely diagrammatic; Fig. 3 is an enlarged side view of the rear pier partly broken away; Fig. 4 is a view looking in the direction of the arrow, Fig. 3; Fig. 5 is an enlarged view of the portion of the rear pier showing the manner in which the bridge is supported thereon; Fig. 6 is a plan view of the pier showing the guide rails thereon; Fig. 7 is an end elevation of the lower portion of the rear pier; Fig. 8 is an end elevation of the front pier partly broken away; Fig. 9 is an enlarged view of the upper portion of the front pier and its swiveled connection with the bridge; Fig. 10 is an end elevation of a portion of the rear pier looking in the direction of the arrow, Fig. 9; Fig. 11 is a cross section on the line 11—11 Fig. 9; and Fig. 12 is a perspective view of one of the shoes by means of which the bridge rests upon the front pier.

The numeral 2 designates a suitable concrete or other foundation for the coal storage plant, the foundation in this instance being located adjacent to the water 3, by means of which the coal or other material is transported to the unloading point in barges 4. Tracks 5 are laid along the water-front adjacent to the outer edge thereof and parallel therewith, while to the rear thereof, or farther in, is the track 6 slightly elevated above the track 5.

Supported upon the tracks 5 and adapted to travel thereon is the front pier 7 and supported upon the track 6 and adapted to travel thereon is the rear pier 8. These two piers support and carry the bridge 9. A clam-shell bucket 10 with its operating cables and sheaves is supported by the bridge 9 and by means of said bucket the coal or other material may be lifted from the boat 4 and placed in the storage pile 11 or transferred directly to be loaded in the cars 12 which run upon tracks 13 which are parallel with track 6. As the mechanism for operating the clam-shell bucket forms no part of my present invention, I have not deemed it necessary to illustrate or describe the same in detail as the construction and operation of such a device comes fully within the knowledge of the ordinary skilled mechanic.

The tracks 5 are parallel with the boat 4, as shown in Fig. 2, while the tracks 6 and 13, or at least one portion thereof, extend off at an angle to the track 5. The rear pier 8 may be built up of steel angles or beams of proper shape so braced as to form a substantial structure. At the lower end of the rear piers 8 are the wheels 14 which have the double flanges adapted to engage both sides of the head of the rails 15. A motor 16 is carried by the pier 8 and from which power is derived to drive the wheels 14 to move the pier along track 6. Suitable gearings 17 transmits the power from the motor 16 to the wheels 14. At the upper end of the pier 8 is the hopper 18 to which the chute 19 is connected for delivering the coal into the cars 12. The coal is discharged from the clam-shell bucket 10 into said hopper 18. On top of the pier 8, at each corner thereof, are the guide rails 20 and engaging said guide rails are the shoes 21 on the carriage 22. The carriage 22 has the wheels 23 upon which the bridge 9 rests. These wheels 23 have the central flange 24 which enters the space 25 formed between the two channel beams 26 forming the lower side girder of the bridge. In this manner the displacement of the bridge with reference to the carriage 22 is prevented. In order to guard against the upward movement of the bridge 9 brackets 27 on the carriage 22 have the idlers 28 engaging the lower flange of the inner channel 26. To provide for the turning of the pier 8, independent of any such rotary motion on the part of the bridge 9, said pier is swiveled to said bridge. A pin 29 carried by the carriage 22 at the midpoint thereof, passes down through an opening in the channel 30 at the top of the pier 8. In this manner the pier 8 is free to turn independent of the bridge, the shoes 21 on the carriage 22 permitting the guide rails 20 to slide therein as said pier turns. The carriage in the meantime is held in line with the bridge 9.

The front pier 7, like the rear pier, is made up of angles and beams suitably braced to form a rigid structure and at the lower end of said pier are the wheels 31 traveling on the rails of track 5. A motor 32 is connected up by suitable gearing to drive the wheels 31. At the upper end of the pier 7 is the wear-plate 33 and resting upon said wear-plate and adapted to slide thereon are the shoes 34. These shoes have a curved bearing 35 resting in contact with the wear-plate 33 and have the flanges 36 which are bolted to the angle bars 37 of the made-up beams 38. These beams 38 support the cross-beams or transoms 39 of the bridge.

Extending up from the upper end of the pier 7 are the angle bars 40 and the channel beam 41. These angle bars 40 and channel 41 are connected by plates 42. A top plate 43 is connected to the angle bars 40. Plates 44 and 45 are secured to the flanges of the channels 39. A pin 46 passes down through openings in the plates 44, 43, channel bar 41 and plate 45. In this manner the pier 7 is swiveled to the bridge 9 so that the end of said bridge, supported by said pier, may swing at an angle to conform to the movement of the rear pier 8, as clearly indicated in Fig. 2. In such case the shoes 34 will slide along the top of the pier 7 moving over the wear-plate 33.

When my improved apparatus is in use and the bridge is in the position shown in full lines, Fig. 2, where the railroad tracks and the tracks upon which the piers travel are parallel with each other, the piers will be in direct line with each other and the coal, when lifted from the boat by the clam-shell bucket, is carried to the rear and delivered into the hopper 18 whence it passes by the chute 19 into the car 12. If, however, the car to be loaded is on a portion of the railroad track which is not parallel to the tracks upon which the front pier travels, but parallel with the track upon which the rear pier travels, it is apparent that the wheels 14 on the rear pier must assume a position parallel with the track while at the same time the bridge remains in a straight line. Accordingly, the rear pier turns slightly on its swivel pin 29, the guide rails 20 sliding in the shoes 21 of the carriage 22 while the carriage 22 travels rearwardly on the bridge together with the pier 8 so as to correspond to the increased distance of the track upon which the front pier travels from the angular track upon which the rear pier and the railway car are located. The movement of the rear pier, therefore, is longitudinally of the bridge while at the same time it has a swinging movement to permit its wheels to conform to the direction of travel which it is required to take upon the track 6. If, however, it is desired to load the clam-shell bucket from one point in the boat, for instance the midpoint, while the cars are located at an angle to said point, power is applied to move the rear pier to a point in line with the car to be loaded, which increases the distance from the point of loading and so causes the rear pier to move rearwardly, while at the same time power is applied to move the front pier 7 slightly so as to keep the clam shell bucket in line with the point in the boat from which it is desired to remove the coal, as clearly indicated in dotted lines, Fig. 2. The fact that the front pier is swiveled to swing permits of this movement while the wheels of the said front pier still maintain their position upon the straight parallel tracks upon which they run.

By my improved apparatus I provide for the handling of coal by the bridge, even though the span of the bridge may vary, where it is necessary to bring the cars on tracks not parallel with the track upon which the front pier travels, while at the same time, even where the railroad track is parallel with the track of the front pier, the bridge may be so adjusted as to remove the coal from a single point in the boat and deliver it to a car off at an angle from such point in the boat. The whole structure may be so proportioned that the tendency of end-wise forces, such as wind, to overturn the pier by lifting the bridge, is overcome by the weight of the bridge while at the same time accidental displacement of the rear pier is guarded against by the rollers 28 engaging the inner flanges of the track stringers.

What I claim as my invention is:

1. In apparatus for storing and handling coal or like material, the combination of a bridge, traveling piers supporting said bridge, one of said piers being movable longitudinally of said bridge, the points of contact of said bridge and pier being variable as regards the bridge and longitudinally fixed as regards the pier, and loading and unloading apparatus carried by said bridge.

2. In apparatus for storing and handling coal or like material, the combination of a bridge, traveling piers supporting said bridge, one of said piers being movable longitudinally of said bridge and having a swivel connection therewith, the points of contact of said bridge and pier being variable as regards the bridge and longitudinally fixed as regards the pier and loading & unloading apparatus carried by said bridge.

3. In apparatus for storing and handling coal or like material, the combination of a bridge, traveling piers supporting said bridge and traveling on tracks on, or substantially on, a level with the base of the storage pile, a turn-table on one of said piers, wheels on said turn-table upon which said bridge rests, said wheels having a fixed relation with reference to said pier, and loading and unloading apparatus carried by said bridge.

4. In apparatus for storing and handling coal or like material, the combination of a bridge, traveling piers supporting said bridge, one of said piers being movable longitudinally of said bridge, the points of contact of said bridge on said movable pier remaining constant with reference to said pier, and loading and unloading apparatus carried by said bridge.

5. In apparatus for storing or handling coal or like material, the combination of a bridge, traveling piers supporting said bridge, one of said piers being longitudinally movable of said bridge and having a plurality of points of contact with said bridge, the center of such points of contact being fixed as regards the pier, and loading and unloading apparatus carried by said bridge.

6. In apparatus for handling coal or like material, the combination of a bridge, traveling piers supporting said bridge, one of said piers being V-shaped in form and movable longitudinally of said bridge, the points of support of said bridge on said V-shaped pier lying outside the point of support of said pier, and loading and unloading apparatus carried by said bridge.

7. In apparatus for handling coal or like material, the combination of a bridge, traveling piers supporting said bridge, one of said piers traveling on a single rail, the points of support of the bridge on said pier lying on opposite sides of said rail, said pier being longitudinally movable of said bridge, and loading and unloading apparatus carried by said bridge.

8. In apparatus for handling coal or like material, the combination of a bridge, traveling piers supporting said bridge, loading and unloading apparatus carried by said bridge, a carriage on one of said piers supporting said bridge and traveling longitudinally thereof, a swivel connection between said carriage and said pier, shoes on said carriage and guide rails on said pier with which said shoes are engaged.

9. In apparatus for handling coal or like material, the combination of a bridge, traveling piers supporting said bridge, loading and unloading apparatus carried by said bridge, a carriage on one of said piers, wheels on said carriage having intermediate flanges formed on their treads, and a slot formed in said bridge adapted to receive said flanges, said bridge resting on said wheels and a swivel connection between said pier and said carriage.

10. In apparatus for handling coal or like material, the combination of a bridge, traveling piers supporting said bridge, loading and unloading apparatus carried by said bridge, a carriage on one of said piers supporting said bridge and traveling longitudinally thereof, and idlers carried by said carriage and engaging inwardly projecting flanges formed on the longitudinal beams of said bridge and a swivel connection between said pier and said carriage.

11. In apparatus for handling coal or like material, the combination of a bridge, traveling piers supporting said bridge, loading and unloading apparatus carried by said bridge, the rear pier being longitudinally movable of said bridge and swiveled thereto, a swivel connection between the front pier and said bridge, a wear plate on said front pier and shoes on said bridge resting on said wear plate.

12. In apparatus for handling coal or like material, the combination of a bridge, traveling piers supporting said bridge, loading and unloading apparatus carried by said bridge, the rear pier traveling longitudinally of said bridge and swiveled thereto, a swivel connection between front pier and said bridge, a bearing plate on said front pier and curved shoes carried by said bridge resting on said bearing plate.

13. In apparatus for handling coal or like material, a combination of a bridge, traveling piers supporting said bridge, loading and unloading apparatus carried by said bridge, the rear pier traveling longitudinally of said bridge and swiveled thereto, a bearing plate on the front pier, shoes carried by said bridge resting upon said bearing plate, a frame on said front pier projecting above said bearing plate and a swivel connection between said frame and the bridge proper.

In testimony whereof, I the said CHARLES S. WILLIAMSON have hereunto set my hand.

CHARLES S. WILLIAMSON.

Witnesses:
ROBERT C. TOTTEN,
JOHN F. WILL.